United States Patent [19]

Göertz

[11] Patent Number: 5,046,065

[45] Date of Patent: Sep. 3, 1991

[54] COMMUNICATION SYSTEM, A STATION TO BE USED IN SUCH A SYSTEM, AND A GATE CONNECTING ELEMENT TO BE USED IN SUCH A SYSTEM, AS WELL AS A DEVICE COMPRISING SUCH A GATE CONNECTING ELEMENT

[75] Inventor: Hendrik M. H. g. Göertz, Eindhoven, Netherlands

[73] Assignee: U.S. Philips Corporation, New York, N.Y.

[21] Appl. No.: 398,111

[22] Filed: Aug. 24, 1989

[30] Foreign Application Priority Data

Aug. 30, 1988 [NL] Netherlands .................. 8802132

[51] Int. Cl.[5] .................................. H04J 3/02
[52] U.S. Cl. .................. 370/85.13; 370/85.14; 370/85.1; 370/85.9; 340/825.5
[58] Field of Search .............. 370/85.13, 85.9, 85.1, 370/85.14; 340/825.5, 825.51, 825.52

[56] References Cited

U.S. PATENT DOCUMENTS

| | | | |
|---|---|---|---|
| 3,731,002 | 5/1973 | Pierce | 370/16 |
| 4,331,834 | 5/1982 | Ganz et al. | 370/85.13 |
| 4,429,384 | 1/1984 | Kaplinski | 370/85 |
| 4,627,052 | 12/1986 | Hoare et al. | 370/85.13 |
| 4,706,080 | 11/1987 | Sincoskie | 370/85.13 |
| 4,811,337 | 3/1989 | Hart | 370/85.13 |
| 4,933,938 | 6/1990 | Sheehy | 370/85.13 |
| 4,947,390 | 8/1990 | Sheehy | 370/85.13 |

FOREIGN PATENT DOCUMENTS

| | | | |
|---|---|---|---|
| 0349099 | 1/1990 | European Pat. Off. | 370/85.13 |
| 0078052 | 3/1989 | Japan | 370/85.13 |
| 0122230 | 5/1989 | Japan | 370/85.13 |

OTHER PUBLICATIONS

R. C. Dixon, "Group Address Structure for Network Service Nodes", vol. 26, No. 3A, 8/83 IBM Technical Discl. Bull. pp. 1198–1200.

Primary Examiner—Douglas W. Olms
Assistant Examiner—Dang Ton
Attorney, Agent, or Firm—Anne E. Barschall

[57] ABSTRACT

A communication system is described comprising different buses which are interconnected via one or more gate connecting elements. There is a transmitter station transmitting a frame that comprises a target address field and one or more destination address fields. If the send and receiver stations are connected to the same bus, the contents of the target address field are sufficient to define the receiver station. In other cases the target address field defines a gate connecting element, whereas the latter fills the the target address field with the contents of one of the other fields. In this way receiver station addresses, which have already been defined on a previous bus, can again be used on the next bus. Furthermore, in a short-frame format, receiver stations on the same bus as the transmitter station can be addressed with very low overhead.

14 Claims, 2 Drawing Sheets

| In | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Out | 0 | 2 | 5 | 3 | 4 | 1 | 6 | 7 | 8 | 9 | 10 | 11 | 12 | 13 |
|  | 0 | 2 | 5 | 3 | 4 | 6 | 1 | 7 | 8 | 9 | 10 | 11 | 12 | 13 |
|  | 0 | 2 | 5 | 3 | 4 | 6 | 7 | 1 | 8 | 9 | 10 | 11 | 12 | 13 |
|  | 0 | 2 | 5 | 3 | 4 | 6 | 7 | 8 | 1 | 9 | 10 | 11 | 12 | 13 |
|  | 0 | 2 | 5 | 3 | 4 | 6 | 7 | 8 | 9 | 1 | 10 | 11 | 12 | 13 |
|  | 0 | 2 | 5 | 3 | 4 | 6 | 7 | 8 | 9 | 10 | 1 | 11 | 12 | 13 |
|  | 0 | 2 | 5 | 3 | 4 | 6 | 7 | 8 | 9 | 10 | 11 | 1 | 12 | 13 |

COMMUNICATION SYSTEM, A STATION TO BE USED IN SUCH A SYSTEM, AND A GATE CONNECTING ELEMENT TO BE USED IN SUCH A SYSTEM, AS WELL AS A DEVICE COMPRISING SUCH A GATE CONNECTING ELEMENT

FIELD OF THE INVENTION

The invention relates to a communication system which operates on the basis of frames. To the communication bus system are connected a transmitter station, and a receiver station which is defined by a destination address. Such a system is used, for example, in a home for communicating control signals, and the organisation is such that the cost of the system and the cost of exploitation of the system remains low. Owing to the organisation on the basis of frames, a plurality of stations can alternately communicate with one another; basically, with each new frame a new combination of send and receiver stations can be specified. The transmitter station is, for example, a controlling microcomputer. The receiver station can be an apparatus for consumer entertainment, a domestic appliance (clock, microwave oven, washing machine), a sensor (temperature, security), a switch (light switch, a door switch or a control valve), or a station for communication with the outside world (modem, telephone answering machine). The address field in such a local communication bus system comprises a fixed number of bit positions, for example 8, so that a maximum of 256 objects can be indicated. In some cases this number is insufficient. A longer destination address field could be defined. In this case, owing to the frame organisation on the basis of bytes, the address length would immediately become twice as long, causing a frame to become 8 bits longer. For a frame comprising many bytes this would be only a relatively limited disadvantage. However, for the above switches and further simple stations a smallest possible frame length is usually aimed at, so that an extension by 8 bits would be a relatively large disadvantage indeed as the overhead will become much larger then. A further disadvantage of extending the destination address is the fact that all stations would have to include a complicated address decoder.

EXEMPLARY BACKGROUND ART

A particular example of such a multi-station network with multiple buses has been described in European Patent Application 60535, corresponding to U.S. application Ser. No. 243,013, filed Mar. 12, 1982 and assigned to Recognition Equipment Corporation. The problem addressed by this citation is to relieve the various buses of the bus system from waiting for transport between stations connected to another bus. This is reached by introducing gate connection elements between buses as separately addressable items. If not addressed, the connection element remains closed. The known solution does not provide for an extendable address length that would be useful, both for locally addressing elementary stations and more complex stations, and for, across one or more such gate connection elements addressing station, while in the latter case also allowing for extendable data fields.

SUMMARY OF THE INVENTION

Among other things, it is an object of the invention to improve the addressing facilities in a bus system mentioned in the opening paragraph to the effect that with a fixed address field length it is rendered possible to re-use an address already assigned within the address field, without creating ambiguous addressing, so that unintentional addressing is avoided, whilst retaining the possibility of defining a (very) small frame length under specific circumstances.

This is achieved, according to a first aspect of the invention, by means of a communication system comprising a bus system having a first bus and a second bus interconnected by a first gate connecting element. The communication system comprises a transmitter station connected to said first bus and a receiver station connected to any of said first and second bus. The transmitter station has a frame generator for generating a frame having at least a frame length indicator, an address and a data item. A first content of said frame length indicator specifies a short-frame format having a first fixed address length and a first fixed data item length that are exclusively operative on the same bus as the transmitter station is connected to. A second content of said frame length indicator specifies a long-frame format having a second fixed address length that is exclusively operative on the same bus as the transmitter station is connected to and a second specifyable data item length. The second fixed address length allows for specifying either said receiver station by way of a destination address when the receiver station is connected to the same bus as the transmitter station, or for specifying said first gate connection element by way of a target address when the receiver station is connected to the second bus. The long-frame format in the latter case also accommodates said receiver station's destination address. The first gate connecting element includes transposing means for then transposing the destination address field's content to the target address' field, as a result of which the receiver station can be addressed directly when the above frame is transmitted over the second bus.

Short frames can now be used with a similar bus, whereas only limited intelligence needs to be incorporated in a gate connecting element. If it is assumed that the destination station is a video recorder, the station can be connected both to the first bus, addressed only by the destination address, and the second bus, addressed by the combination of target address and destination address. Alternatively, it is possible to use two video recorders having identical addresses and being connected to the first and second bus respectively. These addresses are often determined by the internal hardware of the receiver stations and thus no change of this hardware will be required. Transmitter stations addressing a receiver station over the same bus need not be modified either. For example, a television receiver may address a dedicated video recorder in an unmodified fashion. Only when a transmitter station intends to address a receiver station over a different bus via a gate connecting element, must the relevant frame comprise both the target address and the destination address. However, such transmitter stations are usually software-programmable as is the case, for example, with a home computer or a control device for controlling light and indoor climate. In a case like that, setting the target address is simple.

FURTHER ASPECTS OF THE INVENTION

The number of buses may be larger, with one or a plurality of gate connecting elements being inserted each time between two interconnected buses. In a case like this, various strategies with respect to transposing are possible. It is advantageous if the destination address field, as a first field, forms part of a series of various fields whose lengths have been preset. The series is situated between this first field and a last field. The transposing means comprise rotating means for moving the contents of the remaining fields of the said series by one position in the direction of the first field in conjunction with said transposing operation, as a result of which said first field comprises a then current destination address. The transposing means also comprise and further means for transposing the contents of the received target address field to said last field. Owing to this rotation it will be clear at the destination station which route the frame has followed. It will then be simple to return an acknowledge signal along the same route. The transmitter station will then write its own address in said last field. This need not necessarily be the last physical field of the series. Also the original address can be incorporated in this rotation.

Specific destination addresses can be permanently assigned to a specific category of stations, such as video recorders, thermostats or motion detectors for burglar alarms. A plurality of address contents are preferably reserved for gate connecting elements, so that for each bus various address contents can be specified by a respective target address. This enables a flexible configuration. For example, to each bus one video recorder can be connected which is addressable by the same destination address and respective contents of the target address field. It is likewise possible that two or more video recorders of this type are connected per bus, so that there are two (or more) possibilities for the contents of the destination address.

The invention likewise relates to a transmitter station and a gate connecting element to be used in a communication bus system in accordance with the invention. The invention also relates to a device, comprising a gate connecting element as stated hereinbefore, as well as at least two external connections for as many buses, and an internal station which is inserted between a user function in this device and at least one of the latter buses. For a consumer this simplifies the structure of such a communication system, because the gate connecting elements have become invisible as it were, and, consequently, the actual connecting instructions have become more simple.

Further attractive aspects are set out in sub-claims.

BRIEF DESCRIPTION OF THE DRAWINGS

The invention will now be further explained with reference to the following Figures, in which.

DESCRIPTION OF A PREFERRED EMBODIMENT

Figure 1:
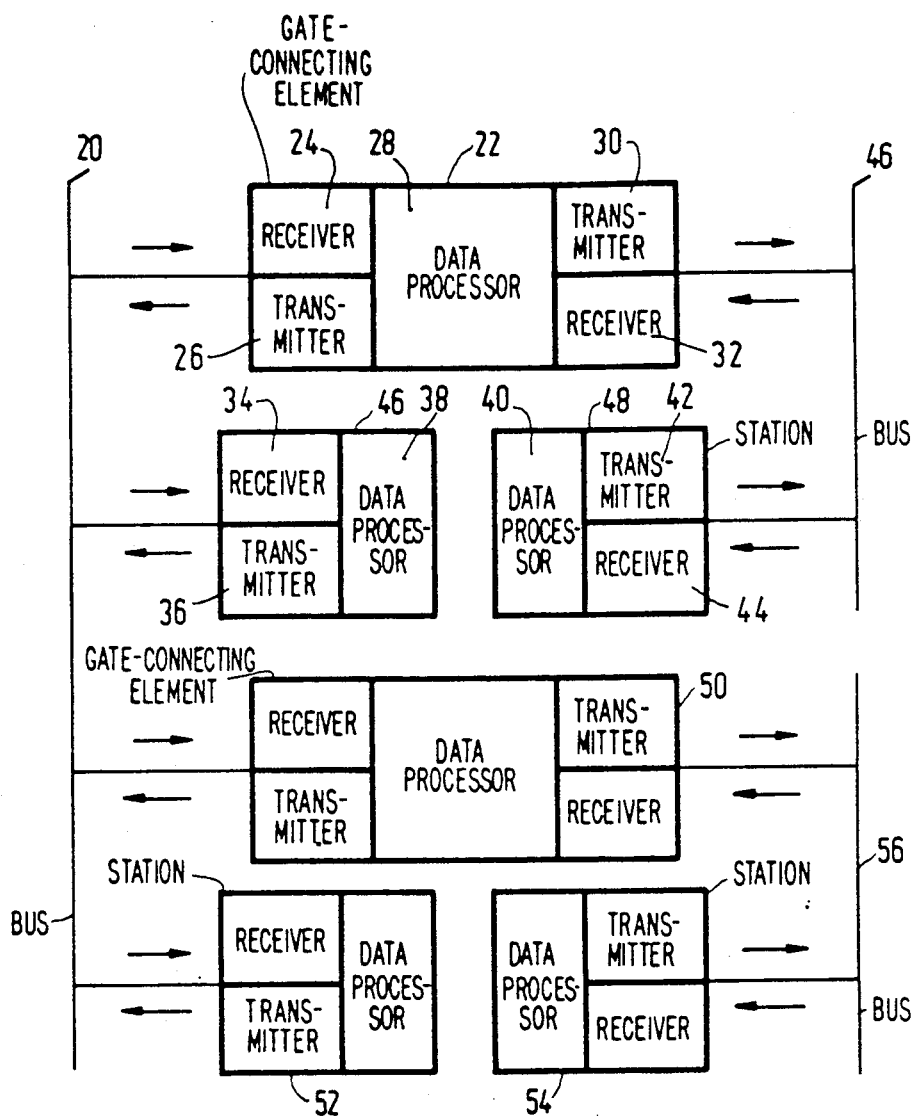
FIG. 1 shows a diagram of a communication bus system.

FIG. 1 is a block diagram of a communication system according to the invention. It comprises three buses 20, 66, 56. The serial buses (1 bit wide) can be designed according to different technologies, such as coax, twisted pair or optical technology. There are two gate connecting elements 22, 50. There are four further stations 46, 48, 52 and 54. With an 8-bit address length the number of stations per bus may vary from 0, 1... to a maximum of 256, including the gate connecting elements coupled to that bus. For a useful communication the number of non-gate-connecting-element stations connected to any bus usually is at least equal to two. The network structure may be different: wider buses, more buses, more stations, more gate connecting elements. A plurality of gate connecting elements may be interconnected between one pair of buses. The gate connecting elements themselves may even be interconnected to form an array-type structure. The buses may be realised in mutually different technologies; in that case, the relevant gate connecting elements are to comprise a technology converting mechanism, for example, between a coaxial cable, a twisted pair cable, an infrared connection or a glass fibre connection. The buses may also be organized according to different protocols, which difference may be manifested at different levels, such as the physical magnitudes (voltage, time), the bit format (NRZ, NRZ-1 and many others), the word format and higher levels. In that case the gate connecting element is to comprise a protocol converter. For simplicity such conversions are disregarded. All stations in this example operate bidirectionally. For example, station 46 comprises a transmitter device 36, a receiver device 34 and a data processor 38. Station 48 comprises a transmitter device 42, a receiver device 44 and a data processor 40. Gate connecting element 22 comprises transmitter devices 26, 30, receiver devices 24, 32 and data processor 28. In practice any connection to the bus will be bidirectional. Basically, it is possible for a station of a very simple structure to operate only as a receiver station and not even to send back an acknowledge signal. Generally, the stations can be very simple or more complicated. The width of the bus data path can be larger, for example 8 bits.

DESCRIPTION OF SEVERAL EXEMPLARY FRAME FORMATS

Figure 2:
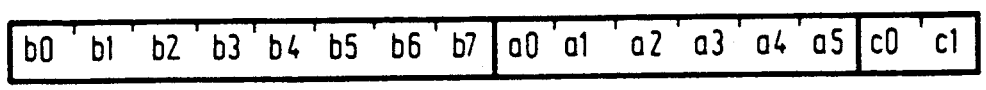
FIG. 2 represents a short-frame format.

FIG. 2 shows a possible short-frame format. It can be used for controlling a simple station, for example, a switch. The frame counts 16 bits. The bits b0...b7 form the priority group. The value of the bits b2, b3, b4 is (011): this defines the frame format. The remaining bits b0, b1, b5, b6, b7 determine the priority level of the relevant frame. Basically, the priority can be determined by the nature of the communication, the identity of the transmitter station and the identity of the receiver station. If two or more prospective transmitter stations simultaneously commence a send operation, one station is selected by means of arbitration known per se, so that the station having the lower frame priority detects the multiplicity and withdraws. This occurs, for example, because the bus forms a wired AND-function: each logic —0—masks in that case any coincident logic —1—signals. The meaning of the remaining bits can be related to the identity of the transmitter station or the nature of the communication to be transmitted. The bits a0...a5 form a destination address field. Consequently, a maximum of 64 simple stations connected to the same bus can be addressed. If the arbitration by means of the priority group is ambiguous, the arbitration may be proceeded with the destination address bits. Bits c0, c1 define a simple command which may be formed in an appropriate and possibly unique manner for the relevant receiver station. For a switch this may be, for example:

switch on, switch off, switch over, read the switch position. Basically, it is possible for two transmitter stations to apply exactly the same command to a single receiver station simultaneously. This is actually no objection.

Figure 3:
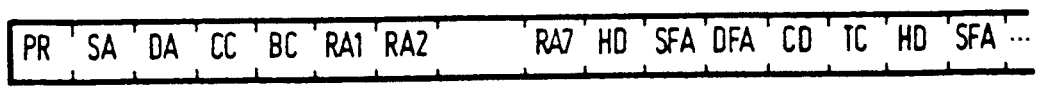
FIG. 3 represents a long-frame format.

FIG. 3 shows a possible format of a long frame. It is formed by means of a sequence of 8-bit bytes which are each indicated by a letter combination. Byte PR comprises the priority code wherein the bits b2, ... b4 naturally have a different value than <011>. Byte SA comprises the send address or original address. This can be used by the receiver station as a destination address for returning an acknowledge signal. For each bus this destination address is sufficient to unambiguously define a receiver station. For a specific physical station the destination address is invariant to the bus (20, 46, 56) to which the station concerned is actually connected. Byte CC comprises a verification code. At bit positions b0 . . . b2, defined with respect to FIG. 2, this byte indicates the number of routing address positions. The remaining bit positions of byte CC are irrelevant here. Byte BC comprises the frame length code which may specify a length from 1. . . 256 bytes. The routing addresses are contained in bytes [RA1 . . . RA7], if present. The quantity of these addresses is specified by byte CC. Thus, if the code in CC shows —0—, there is not single routing address. The maximum number of routing addresses is 7 in this case. The first routing address is transposed to the position of the target address field DA in the first gate connecting element reaching the frame concerned. During this operation the contents of the fields SA, DA, RA1, RA2. . . RA7 are rotated as follows: DA, RA1, RA2. . . RA7, SA. After the second gate connecting element is reached, the sequence is again rotated by one position: RA1, RA2. . . RA7, SA, DA.

Finally, after at most seven gate connecting elements, the intended receiver station is reached. If the receiver station is reached at an earlier instant, the unused routing addresses are omitted. In the latter case the last relevant gate connecting element shows, for example: RA5, SA, DA, RA1. . . RA4. In this case the target address stands for the address determining the transport over the current bus, the destination address the address determining the transport over the next bus.

In another embodiment of the invention the original address sequence remains stationary; the series of routing addresses first comprises the target address DA, then the "real" routing addresses insofar as they are relevant. For the first bus transport the address DA is copied in the target address field, for the second bus transport the address RA1, for the third bus transport the address RA2 and so on, until the intended receiver station is reached. The address to be copied is indicated by bits in the byte CC. The remaining bytes of the frame are only referred to by way of illustration: byte HD provides a header, for example, a serial number or a code indicating that now the message proper commences. Byte SFA provides a source function address specifying the function of the source by means of an address for a local memory (in the definite receiver station). Byte DFA does the same for the function of the ultimate receiver station. Byte CD specifies a data unit or a command. Byte TC specifies a terminal code. Thus, it is possible for various CD bytes to be consecutive. Then a new header may appear. The frame end is specified by the contents of the byte BC. By counting down, the receiver station knows when this end occurs.

EXEMPLARY EMBODIMENT OF A DEVICE COMPRISING A GATE CONNECTING ELEMENT

Figures 4, 5:
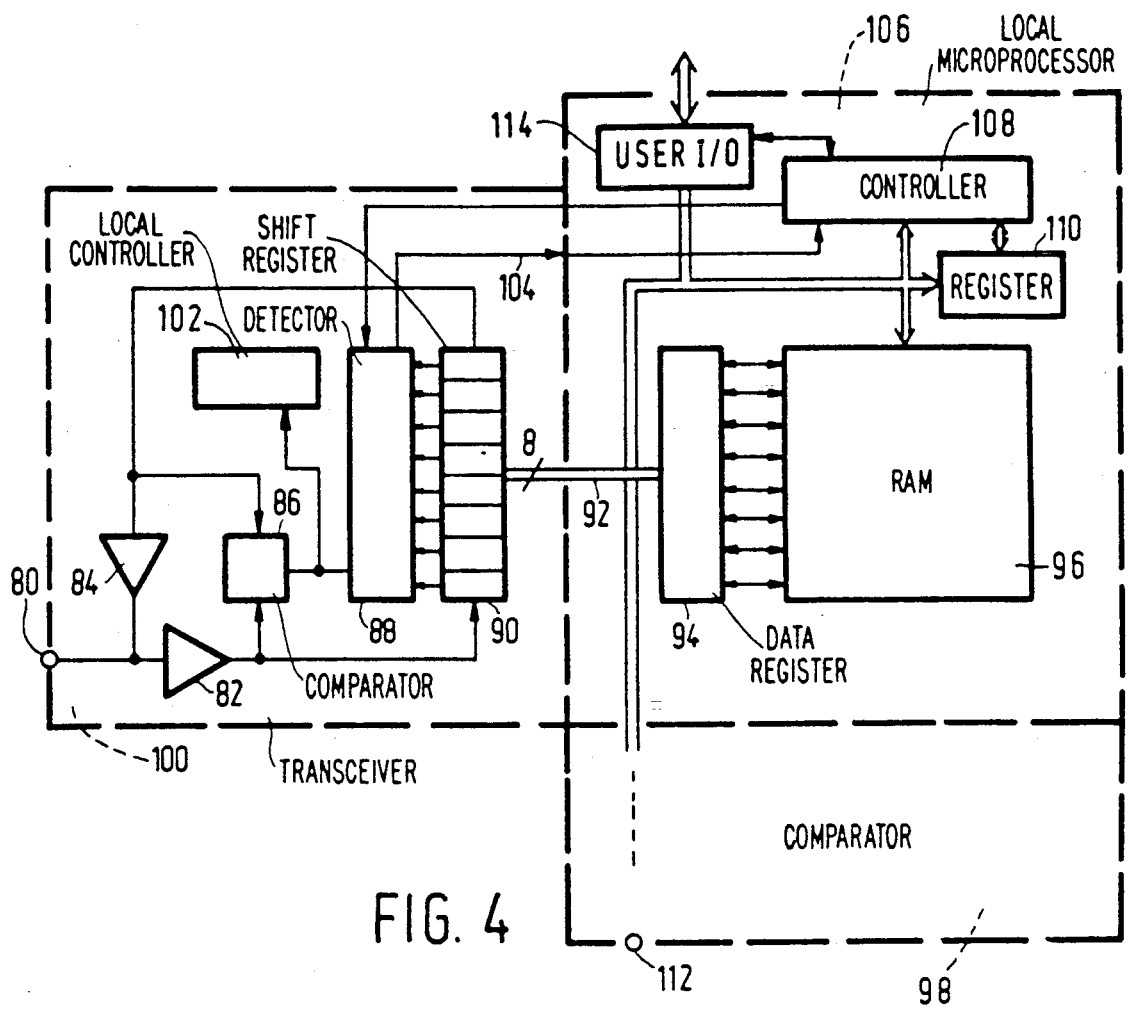
FIG. 4 is a block diagram of a device comprising a gate connecting element.
FIG. 5 illustrates of routing operation of Microprocessor in FIG. 4

FIG. 4 is a block diagram of a device comprising a gate connecting element. Block 100 comprises a transceiver device to be connected to a single wire bus symbolized by connection 80. A receiver amplifier 82 feeding a signal comparator 86 as well as a shift register 90 are coupled to this connection 80. A series output of shift register 90 is connected to transmitter amplifier 84 and also to comparator 86. The transmitter amplifier is also connected to the bus. In the receive position, shift register 90 is serially loaded. In the send position, shift register 90 is read in series. If, in the latter case, the comparator 86 detects a discrepancy, this implies that the transmitted signal looses an arbitration and the relevant station, in this case the gate connecting element, is to stop transmitting. This is signalled to a local controller 102: transmission is terminated and possibly resumed at an instant to be determined later. Such mechanisms are known per se and are not further discussed for simplicity. Element 88 is a detector. It can in the first place detect the bits indicating a short-frame: if these bits are received the gate connecting element is deactivated. The bits of the priority byte are then only used for settling the arbitration between the prospective transmitter stations. If no short frame is concerned, the byte PR is stored in data RAM 96 by data register 94. In specific cases when the frame is transported, the gate connecting element generates its own individual priority byte and deactivates the received priority byte which is thus superseded. After the byte PR the byte SA is received. The latter is transferred to data register 94 via bus 92. Then the byte DA, the target address, is received. This byte is compared in comparator 98 to the relevant address of the gate connecting element. If the two match, there is an OK signal on line 104 to the local microprocessor 106 which, by means of address counter 108, stores the consecutive bytes on the respective positions of data RAM 96. During this operation bytes CC and BC have specific functions as has been mentioned hereinbefore: byte BC loads a downcounter and indicates, when the "0" count is reached, that the frame has been received completely. This counter is connected to bus 92 and not shown for simplicity. The byte CC comprises the indication over the number of routing addresses. They are loaded in register 110 (three bits). Thereafter, the remaining bytes of the frame are stored.

Similarly, there is a second transceiver device 98 which corresponds with device 100 and is therefore shown only in a notional fashion. The bus connection concerned is 112. The microprocessor 106 may be a conventional building block which, however, is programmed in a special way. If the addresses in the memory 96 range from 0 . . . 255, and the number of routing addresses range from 0 . . . 7, the addresses after being transposed are read according to FIG. 5B. The first line shows the order in which the bytes are written. The second line shows the order in which they are read if a single routing address, the ultimate destination address, is present. In that case RA1(5) is read at position 2 and DA (target address) at position 1, and source address SA(1) at position 5. If there are two routing addresses, SA is read at position 7 and so on, up to, eventually, position 11, if there are 7 routing addresses. The addresses are supplied by the controller 108 of the microprocessor 106 which is connected to the register 110.

In the case under discussion the microprocessor 106 comprises not more than a single bus 92 for data and addresses. In many cases there are two separate buses. For simplicity this is not further discussed: in that case there will generally be in excess of 8 address bits. The memory 96 can then, for example, accommodate two frames which are received simultaneously (more or less) at terminals 80, 112. The memory 96 can then accommodate further user information, for example, if the relevant gate connecting element forms part of a controller which transmits preset control frames to respective stations at specific instants. For this purpose, the local device may also comprise user input/output equipment 114 such as a keyboard and a screen. In this case the station function is integrated to a large extent with that of the gate connecting element. In another embodiment of the invention the user function comprises an individual transceiver device (100, 98) on one of the two bus terminals. Different arrangements such as may be present have not been indicated separately for simplicity:

physical conversion between the signals at terminals 80, 112
(I.R/twisted pair/coax)
ditto protocol conversion
separate data processing in the user's function
detailed structure of the microprocessor of the gate connecting element.

I claim:

1. A communication system comprising:
   a) a first bus;
   b) a second bus;
   c) a gate connecting element for connecting the first and second buses;
   d) a receiver station connected to either of said first or second buses;
   e) a transmitter station connected to said first bus, having a frame generator for generating a frame including
      i) a frame length indicator including
         A) a first content for specifying short-frame format including a first address length and a first fixed data item length; or
         B) a second content for specifying a long-frame format including a second fixed address length and a second specifiable data item length;
      ii) an address field which is usable on only said first bus, in the case of said long-frame format said address field being:
         I) a destination address field for identifying said receiver station, when said receiver station is connected to the same bus as the transmitter station, or
         II) a target address field for identifying the gate connecting element, when the receiver station is connected to the other bus, said long-frame format then also accommodating said receiver station's destination address field; and
      iii) a data item which in the case of said short-frame format is usable on only said first bus; and
   f) transposing means, within the gate connecting element, for transposing data in the destination address field with data in the target address field.

2. A communication system as claimed in claim 1, wherein the first gate connecting element acts as a transmitter station for a second gate connecting element that is connected to the second bus for thereon acting as a receiver station, and which is, together with a second receiver station, is connected to a third bus.

3. A communication system as claimed in claim 2, comprising a series of interconnected buses, wherein respective gate connecting elements are inserted between any pair of interconnected buses.

4. A communication system as claimed in claim 1, wherein two receiver stations having identical destination addresses are connected to different buses of the system and can be addressed by a specific transmitter station by means of identical destination addresses and different target addresses.

5. A communication system as claimed in claim 1, wherein
   the destination address field, as a first field, forms part of a series of various fields of uniform lengths, which series is situated between said first field and a last field, and
   said transposing means comprise
      rotating means for moving data in the fields of said series, other than said first field, by one position in the direction of the first field, as a result of which said first field contains a then current destination address, and
      further means for moving data which was originally in the target address field to said last field.

6. A communication system as claimed in claim 5, wherein the transmitter station further includes an original address generator for filling said last field with an original address, so that the frame in this last field always indicates the current origin on that bus.

7. A communication system as claimed in claim 1, wherein said receiver station is included in a category of stations, and the data in the destination address field formed by the transmitter station are permanently assigned to said category.

8. A communication system as claimed in claim 1, wherein each one of a plurality of gate connecting elements connected to an arbitrary bus is identified by a particular respective data pattern in the target address field.

9. A communication system as claimed in claim 1, wherein all said buses comprise a data path having a width of 1 bit.

10. A communication system as claimed in claim 1, wherein said first fixed data item length is less than a lower bound to said second specifiable data item length.

11. A communication system as claimed in claim 1, wherein short-frame format has a length which is less than a second lower bound to said long-frame format's length.

12. A transmitter station for use in a communication system as claimed in claim 1, wherein the transmitter device is operative for placing said target address field in a frame position before any destination address field when a receiver station is to be activated which is connected to a different bus than the above transmitter station.

13. A gate connecting element for use in a communication system as claimed in claim 1, comprising
   a local memory for storing the data from all said fields in order of reception, and
   read control means for reading out, upon reception, data from said destination address field in a time position which corresponds with a receive position of said target address field inside the frame.

14. A device comprising a gate connecting element as claimed in claim 13, and also including at least two external connections for as many buses, and an internal station that is connected between a user function in that device and at least one of the latter buses.

* * * * *